UNITED STATES PATENT OFFICE.

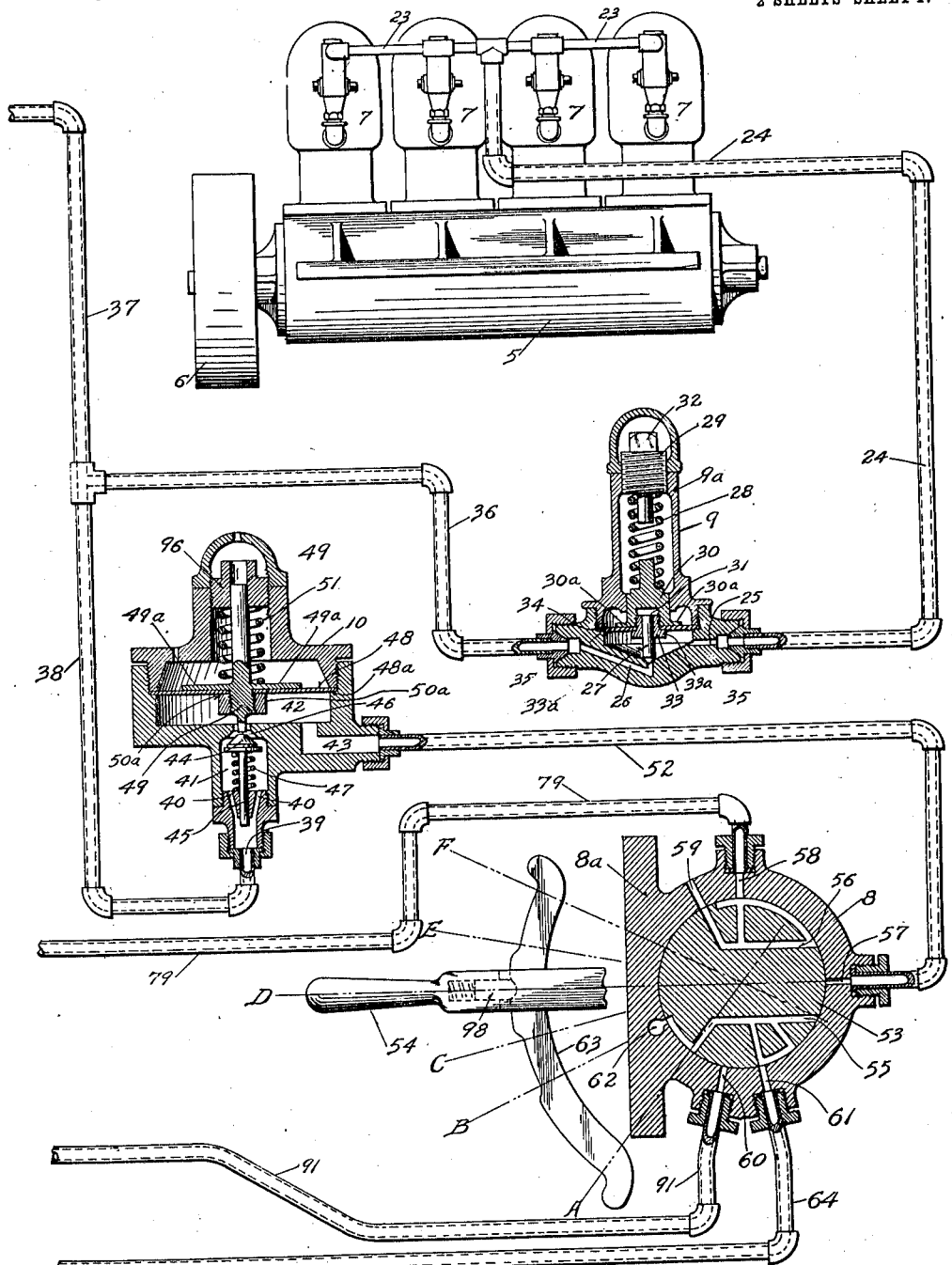

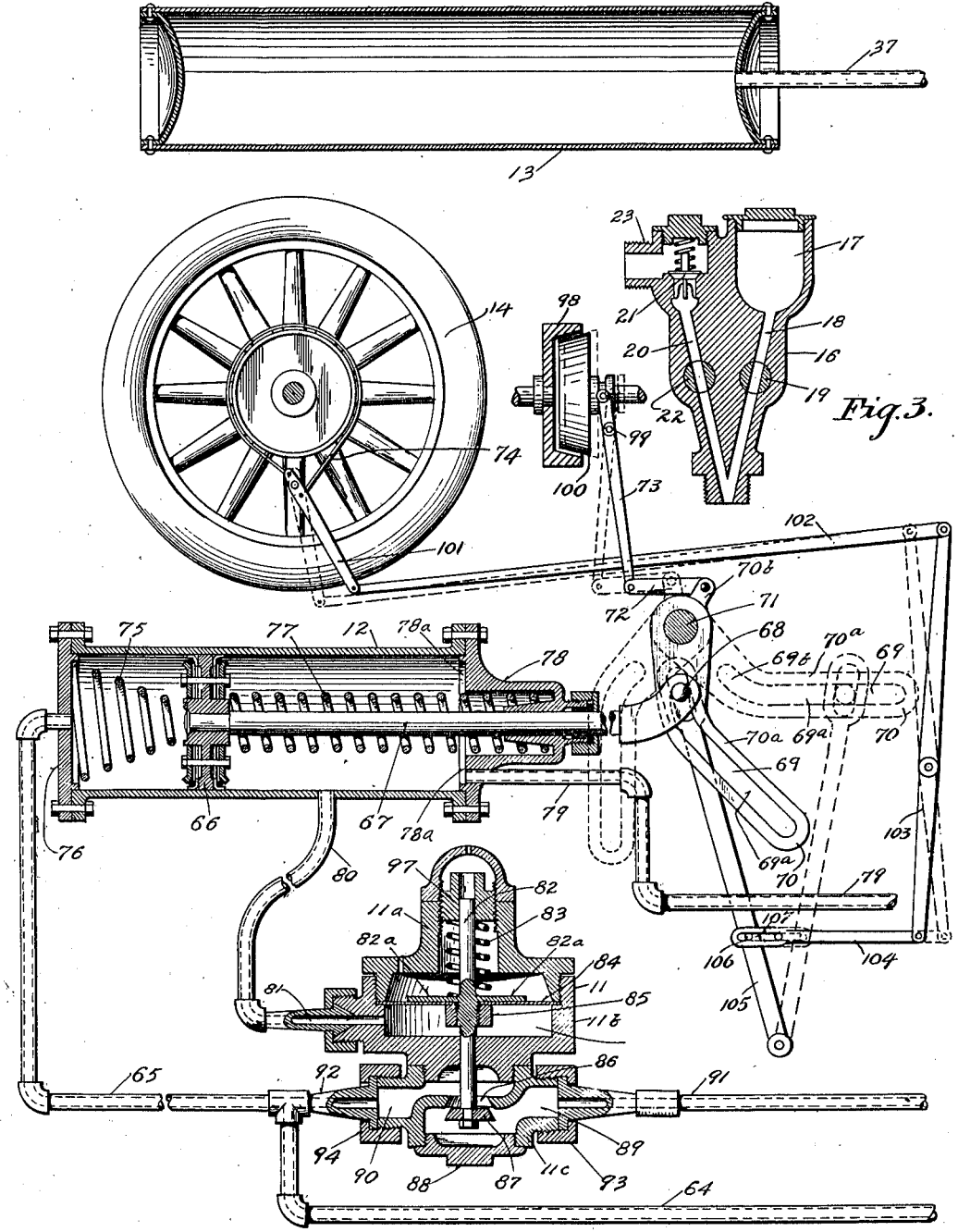

HENRY M. KUGLER AND WILLIAM T. CLARK, OF BUFFALO, NEW YORK.

AUTOMOBILE CLUTCH AND BRAKE CONTROLLING MECHANISM.

974,281.  Specification of Letters Patent.  Patented Nov. 1, 1910.

Application filed May 20, 1909. Serial No. 497,374.

*To all whom it may concern:*

Be it known that we, HENRY M. KUGLER and WILLIAM T. CLARK, citizens of the United States, and residents of Buffalo, county of Erie, and State of New York, have invented certain new and useful Improvements in Automobile Clutch and Brake Controlling Mechanisms, of which the following is a full, clear, and exact description.

This invention relates to controlling mechanism for the clutches and brakes of automobiles and is particularly adapted for use on those vehicles which are propelled by means of explosive engines.

In producing our invention we have sought to provide a means which would effectively control the brake and clutch mechanism of any vehicle and at the same time perform such service in an efficient and simple way. We have also sought to produce a brake and clutch control for vehicles of the class named which could be easily and cheaply manufactured and one which would not easily get out of order.

It is well known to those skilled in the art that brakes which are controlled by foot power or manual means are very difficult to control when applied to high power machines or any machines running at a high speed. Attempts have been made to produce air brakes for automobiles but devices of that character have heretofore been very expensive to manufacture and so complicated in design that they easily get out of order.

In producing our invention we have overcome the disadvantages already set forth.

The many advantages which will result from the use of our invention will be evident to those skilled in the art from the following description and the accompanying drawings.

We have shown in the accompanying drawings a diagrammatic representation of our braking means as applied to an automobile and in these drawings: Figure 1 shows that part of our invention which is connected to the cylinders of an engine and the controlling means while in Fig. 2 there is shown our invention as connected to the fluid reservoir and the brake and clutch control. Fig. 3 is an enlarged view of a priming cup and check valve combined which is designed to be connected with the engine cylinders.

It will be apparent that the complete invention can be readily seen by placing side by side Figs. 1 and 2 of the drawings.

In the succeeding description and claims the term fluid will be used to describe the engine exhaust gases which are employed as the source of power to operate the mechanism herein shown and described. It will be understood, however, that by the term "fluid" we mean to include not only the engine exhaust gases but air or any other form of gases or fluids which are capable of furnishing power to operate the mechanisms comprised in our invention.

5 represents the base of an ordinary gas engine and 6 the fly-wheel of the engine. The four cylinders of the engine are represented at 7.

8 represents partly in section and partly in elevation the engine exhaust fluid controlling means.

9 is a compression retaining valve; 10 a pressure reducing valve; 11 a clutch controlling valve; 12 an exhaust fluid cylinder and 13 a fluid reservoir.

14 represents an ordinary automobile wheel equipped with a band brake and 98 represents an ordinary automobile clutch. This is illustrated only for the purpose of clearness in description and representation, it being understood that brakes other than band brakes may be as readily controlled by our invention as that shown in Fig. 2.

Suitably secured to each of the engine cylinders 7 is a combined priming cup and check valve 16. This combined priming cup and check valve may be placed at any position on the cylinders where it will receive pressure from the explosion of the engine but preferably in the position where the ordinary priming cup is secured. For convenience in the drawing the combined priming cup and check valve is shown in a position some distance above the lowermost position of the piston. The combined priming cup and check valve comprises a priming cup 17 connected with a port 18, said port leading into the cylinder heads of the engine in the ordinary way. A cut-out valve 19 is provided for closing or opening the port 18 in the usual manner. A port 20 leads from the cylinder 7 to a check valve 21. The normal position of the check valve is such that the engine exhaust fluid will pass upwardly through the port 20 but cannot pass downwardly therethrough. A cut-out valve 22 is arranged so that when desired the port 20 may be opened or closed in the same manner as the cut-out valve 19 is adapted to open or close the port 18. Leading from the ports 20 are pipes 23 which are adapted to conduct the exhaust fluid passing upwardly through the port 20 to the pipe 24 and thence to the compression retaining valve 9. The compression retaining valve 9 is provided with a port 25 leading from the pipe 24 and a port 26 leading from the port 25. A needle valve 27 is adapted to be seated over the port 26 and when so seated it prevents any gases from passing from the port 25 to the port 26. Within the valve casing 9ª we provide a spring 28 one end of which rests against the under side of the plug 29 and the other end rests against the diaphragm base 30. The plug 29 is screw-threaded to mesh with corresponding threads in the valve casing 9ª at the top of the valve casing. The diaphragm base 30 is adapted to have a slight vertical movement within the lower part of the valve casing 9ª. The normal tendency of the spring 28 is to force the diaphragm base 30 downwardly. Tension on the spring 28 is governed by the position of the plug 29. The position of the plug 29 may be adjusted as desired by turning the head 32 so as to screw or unscrew the plug within the valve casing. We have shown the diaphragm base 30 bored out at 31 and interiorly screw-threaded. A casting 33, which is adapted to carry the needle valve 27, is screwed into the bottom of the diaphragm base 30 as clearly shown in Fig. 1. The casting 33 is provided with a flange 33ª and the bottom of the diaphragm base is provided with a similar flange 30ª. Between the flange 30ª of the diaphragm base 30 and the flange 33ª of the casting 33 we place a diaphragm 34 which is adapted to seat itself around its entire circumference on a shoulder 35 formed in the casing 9ª of the pressure retaining valve 9.

It will be seen from the foregoing description of the compression retaining valve 9 that when a pressure from the engine cylinder exists in the port 25 this pressure will exert itself upon the diaphragm 34 and slightly raise it so that the needle valve 27 will be lifted slightly away from its seat and thus allow the exhaust fluid to pass from the port 25 into the port 26. The valve 9 will thus maintain the compression in the cylinders 7 and this will make the starting of the engine very easy. When the pressure of the engine exhaust diminishes or gets below the predetermined point the diaphragm will, on account of the tension of the spring 28 be thrown downwardly, thus seating the needle valve 27 and closing the port 26. The amount of pressure necessary to raise the needle valve 27 from its seat may be governed entirely by the position of the plug 29 in the valve casing 9ª so that adjustment can be made to maintain the required compression in the cylinders 7. The port 26 leads into a pipe 36 and the pipe 36 leads into a pipe 37 which then leads into the exhaust fluid reservoir 13. A pipe 38 leads from the pipes 36 and 37 into a port 39 in the pressure reducing valve 10. Leading from the port 39 are passages 40 through which the exhaust fluid may pass into a port 41 thence into the ports 42 and 43 unless the valve 44 closes the passageway from the port 41 to the port 42. The valve 44 is mounted upon a stem 45 and it is adapted to seat itself on the seat 46 leading from the port 41 to the port 42. The spring 47 surrounds the stem 45 and one end of the spring rests against the casting through which the passage ways 40 are made and the other end rests against the valve 44. Mounted within the casing of the valve 10 is a diaphragm 48 which rests upon a shoulder 48ª throughout its circumference. This diaphragm 48 is held between the flange 49ª preferably made integral with the stem 49 and the flange 50ª which is screw-threaded to the stem 49. The lower end of the stem 49 is adapted to contact with the top of the valve 44 and the upper end of the stem is adapted to have a slightly vertical movement within the casing of the valve 10 as clearly shown in Fig. 1. A spring 51 at its lower end rests against the flange 49ª and the upper end rests against a plug 96 screw-threaded to the casting of the valve 10. The tension of the spring 51 is such that any pressure below a predetermined pressure will not throw the diaphragm 48 upwardly. If, however, a pressure greater than the predetermined pressure exists in the port 42 the diaphragm 48 will be thrown upwardly thus drawing the stem 49 away from the valve 44 and allowing the valve 44 to be seated on its seat 46. This action will close the opening from the port 41 into the port 42. Any lower pressure will allow fluid to pass from the port 41 into the port 42. A pipe 52 leads from the port 43 to the fluid controlling means 8. These fluid controlling means are provided with a plug valve 53. This plug valve 53 is revoluble by means of the handle 54 and is provided with ports 55 and 56 which at different positions of the plug valve will register with ports 57, 58, 59, 60, 61 and 62 in the casing 8ª of the valve controlling means. The handle 54 is adapted to be rotated so as to occupy any one of the positions indicated by the lines A, B, C, D, E, and F. The handle 54 is provided with a lock pin 98 controlled by the operator which is adapted to lock the handle 54 in any of the positions A, B, C, D, E or F on the guide plate 63. When the handle 54 is thrown to the position A on the guide plate 63 the port 57 will register with the port 55 so that the fluid will be conducted through the pipes 64 and 65 into the brake cylinder 12. The brake cylinder 12 is provided with a suitably packed piston head 66 carried on the piston rod 67. One end of the piston rod 67 carries a pin 68 which is adapted to be locked so that it will pass back and forth in a slot 69 of the arm 70ª of the bell crank 70. This bell crank 70 is rotatably mounted on a shaft 71 carried by the frame of the machine. The arm 70ᵇ of the bell crank 70 is pivotally connected with levers 72 and 73. The lever 73 is pivoted at 99 and its upper end is engaged with the sliding clutch member 100 in any suitable manner. A spring 75 is placed within the piston cylinder 12 and has one of its ends resting against the cylinder head 76 and the other against the piston head 66. The normal tendency of this spring 75 is to throw the piston head 66 away from the cylinder head 76. A spring 77 is placed within the piston cylinder 12 and one end rests against the piston head 66 and the other against the cylinder head 78. The normal tendency of this spring is to throw the piston head 66 away from the cylinder head 78. Leading from the cylinder head 78 is a pipe 79 which leads to the port 58 in the fluid controlling means 8. The port 58 registers with the port 56 when the plug valve 53 is in certain positions.

It will be noted that the slot 69 in the arm 70ª of the bell crank 70 has a straight portion 69ª and an angular portion 69ᵇ, the straight portion 69ª being much longer than the angular portion 69ᵇ. The band brake 74 is secured as shown or in any other suitable way to the arm 101. The arm 101 is connected to the pin 68 by means of levers 102, 103, 104 and 105, the upper slotted end of the last mentioned lever is engaged with the pin 68. At some suitable point in the lever 105 is fixed a pin 106 which slides in the slot 107 provided in one end of the lever 104. The slot 106 in the lever 104 is of such a length that while the pin 68 is traveling through the angular portion 69ᵇ of the slot 69 there will be no movement of the lever 104. When the pin 68 reaches the straight portion 69ª of the slot 69 the pin 106 carried by the lever 105 will be at the inner end of the slot 107 in the lever 104 and will then operate upon this lever and the series of levers connected thereto in a manner to set the brake as hereinafter described. When the piston head 66 travels from either its normal position as shown in Fig. 2 or from the cylinder head 76 to a position just past the pipe 80 the piston rod 67 will move the arm 70ª of the bell crank 70 from either the position shown in full or the lower position shown in dotted lines to the upper position shown in dotted lines in Fig. 2. During this travel the piston pin 68 to which the piston rod 67 is secured will travel from the upper end of the angular portion 69ᵇ of the slot 69 down to the straight portion 69ª of that slot. When the piston head 66 travels from the pipe 80 to the shouldered ends 78ª of the piston head 78 the pin 68 will travel along the straight portion 69ª of the slot 69. The travel of the pin 68 through the angular portion 69ᵇ of the slot 69 operates to disengage the clutch mechanism. When the pin 68 has reached the straight portion 69ª of the slot 69 the pin 106 carried by the lever 105 will have reached the inner end of the slot 107 in the lever 104 and a further travel of the pin 68 through the straight portion 69ª of the slot 69 will not only serve to keep the clutch in its uncoupled position but will operate the levers 105, 104, 103 and 102 and thus apply the brake 74 on the vehicle. It will be seen that it is impossible to force the clutch in when the brake is set since the position of the pin 68 in the slotted portion 69ª will lock the clutch in its uncoupled position while the brake is set.

The pipe 80 leads from the brake cylinder 12 to the clutch controlling valve 11 and connects with a port 81 in the last mentioned valve. This valve is constructed very similarly to the pressure reducing valve 10. The ports in the valve 11 are arranged somewhat differently from the ports in the valve 10 but the valve mechanism itself is substantially the same. Suitably seated within the upper valve casing 11ª is a valve stem 82 adapted to move vertically within the valve casing. The valve casing of the valve 11 is preferably made in three parts 11ª, 11ᵇ and 11ᶜ. The valve stem 82 is provided with a flange 82ª and between the flange and the plug 97 which is screw-threaded to the inside part of the valve casing 11ª of the valve 11, is placed a spring 83 the normal tendency of which is to hold the flange 82ª downwardly. A shoulder is formed between the parts 11ª and 11ᵇ of the valve 11 and these two parts are screw-threaded with each other as clearly shown in Fig. 2. A diaphragm 84 rests throughout its periphery on the shoulder formed between the parts 11ª and 11ᵇ of the valve casing and is held between the flange 82ª of the stem 82 and a jam nut 85 carried by the said stem 82. The stem 82 passes through the valve casing part 11ᵇ and likewise through a port 86 in the valve casing part 11ᶜ. A valve 87 is secured to the lower end of the stem 82 and has its seat in the port 86. A nut cap 88 is screw-threaded to the valve casing part 11ᶜ and is provided so that easy access can be obtained to the valve 87 and thus allow its repair or regulation.

As shown in Fig. 2 the valve casing parts 11ᵇ and 11ᶜ are screw-threaded to each other but it will be evident that these two parts could be made in one part if desired. The valve casing part 11ᶜ is provided with ports 89 and 90 which connect with each other through the port 86 when the valve 87 is away from its seat. A pipe 91 connects with the port 89 and a pipe 92 connects with the port 90. A tight union is made possible between the pipe 91 and the valve casing part 11 by means of a flange nut 93 screw-threaded to the valve casing part 11ᶜ. A similar union is formed between the valve casing part 11ᶜ and the pipe 92 by means of a flange nut 94.

Having thus described the several parts of our invention we will now describe its method of operation. Assuming that the fluid reservoir 13 is empty and that it is desired to obtain pressure therein: Cut-out valve 22 in the check valve 16 is first thrown open so as to allow the fluid to pass from the cylinder 7 through the port 20 into the pipe 23. Such fluid will pass whenever the engine is running and explosions occur. From pipe 23 the fluid will be conducted by the pipe 24 to the compression retaining valve 9 and it will then pass into the port 25 lifting the diaphragm 34 so that the needle valve 27 is lifted from its seat. The fluid will then pass into the port 26 and thence through the pipes 36 and 37 into the fluid reservoir 13. A compression of any predetermined amount may be maintained in the cylinder 7 by regulating the tension on the spring 28 which governs the diaphragm 34 and the needle valve 27. This regulation is obtained by means of the adjustable plug 29.

It is well known that the pressure of the fluid in explosive engines before explosion is less than during and after the explosion. We have already indicated that the pressure retaining valve 9 is so regulated as to maintain a predetermined pressure in the cylinders 7 equal to the pressure of the fluid before explosion. Clearly therefore, the pressure of the fluid after explosion will be sufficient to pass through the pressure retaining valve 9 and the other passages just described into the fluid reservoir 13 and there be stored ready for use on the machine.

It will be evident that the amount of pressure of fluid contained in the fluid reservoir 13 will depend upon the strength and rapidity of the explosions in the cylinders 7. This pressure may be and usually is greater than that desirable for braking purposes and we therefore provide the pressure reducing valve 10 which will prevent any greater fluid pressure reaching the brake cylinder 12 than is predetermined by the regulation of the reducing valve 10. This regulation as heretofore described is maintained in a similar way to the regulation of the compression retaining valve 9.

It will be seen from the foregoing that the fluid pressure between the valve 10 and the brake cylinder 12 is maintained at any predetermined pressure all of the time.

The automobile being assumed to be standing still the first action of the driver will be to throw the handle 54 over to the position indicated by the line F. This will move the plug valve 53, so that the port 57 will register with the port 56 and the port 55 will register with the port 62 which latter port leads directly to the atmosphere. The port 56 will likewise register with the port 58. Fluid will then pass from the fluid reservoir 13 through the pipes 37 and 38 thence through the pressure reducing valve 10, pipe 52, ports 57, 56 and 58, pipe 79 into the brake cylinder 12. This will drive the piston head 66 against the pressure of the spring 75 up to the cylinder head 76. Thus the piston rod 67 will draw back the arm 70ᵃ of the bell crank to the substantially vertical position shown in dotted lines in Fig. 2, thus operating the lever 73 and driving the clutch mechanism into a coupled position. The fluid which is between the piston head 66 and the cylinder head 76 will be conducted therefrom through the pipes 65 and 64 and ports 61, 55 and 62 to the atmosphere. Assuming now that it is desired to throw out the clutch: The driver moves the handle 54 to the position indicated by the line B. This makes the port 57 register with the port 55 and the latter registers with the port 60. At the same time the port 58 registers with the port 56 and the latter registers with the port 59 which leads to the atmosphere. By this movement of the handle 54 and the plug valve 53 fluid can pass from the fluid reservoir 13 through the pipes 37 and 38, the pressure reducing valve 10, the pipe 52, ports 57, 55 and 60, pipe 91, ports 89, 86 and 90, pipes 92 and 65 into the brake cylinder 12. This will not seat the valve 87 on its seat in the port 86 since the spring 83 is sufficiently strong to prevent the pressure which is maintained through this pipe 91 from seating the valve 87 on its seat. The fluid conducted through the passages described will drive the piston head 66 against the tension of the spring 77 thus forcing the piston rod 67 so that it will throw the arm 70ᵃ of the bell crank 70 toward the position shown in the upper dotted lines in Fig. 2.

The travel of the piston head 66 from the position shown in full lines in Fig. 2 or from the cylinder head 76 up to and just past the pipe 80 is necessary before the clutch is thrown out. During the travel of the piston head 66 just past the pipe 80 the piston rod 67 throws the arm 70ᵃ of the bell crank 70 from its lowest position indicated in dotted lines in Fig. 2 to the highest position similarly indicated in that figure. Meanwhile the pin 68 will be driven from the part 69ᵇ of the slot 69 to the straight part 69ᵃ of that slot, thus disconnecting the clutch mechanism. After the piston head 66 has passed the pipe 80 the fluid which was conducted through the passages described into the brake cylinder 12 will be thence conducted through the pipe 80 and the port 81 into the valve chamber 95. The pressure on the diaphragm 84 together with the pressure on the valve 87 will be sufficient to seat the valve 87 in the port 86 and thus prevent any further fluid from passing into the brake cylinder 12. This will stop the travel of the piston head 66 and prevent the application of the brakes. The fluid between the piston head 66 and the cylinder head 78 will be driven from the brake cylinder through the pipe 79, ports 58, 56 and 59 to the atmosphere. If now it is desired to apply the brake to the vehicle, the driver throws the handle 54 to the position indicated by the dotted line at A. This will move the plug valve 53 so that the port 57 will register with the port 55 and the latter will register with the port 61. At the same time the port 56 will register with the ports 58 and 59. This will allow the fluid to travel from the fluid reservoir 13 through the pipes 37 and 38, the pressure reducing valve 10, pipe 52, port 57, port 61, pipes 64, and 65 into the brake cylinder 12. This will drive the piston head 66 toward the cylinder head 78 and during this movement the pin 106 will engage with the inner end of the slot 107 in the lever 104. As long as the pin 68 is in the straight portion 69ª of the slot 69 the clutch will be locked in the uncoupled position. While the pin 68 is traveling through the straight portion 69ª of the slot 69 from left to right it will rotate the lever 105 about its fulcrum and thereby levers 104, 103, 102 and 101 will be actuated so that the brake 74 of the vehicle will be applied. If now it is desired to release the brakes, the driver moves the handle 54 from the position indicated by the line A to the position indicated by the line D. This moves the plug valve 53 so that the port 55 registers with the ports 61 and 62 and the port 56 registers with the ports 58 and 59. It will be clear from the foregoing description that this position of the plug valve will allow the release of the air in the pipes 79, 64, and 91 to the atmosphere thus allowing the piston head 66 to go back to its normal position as indicated in full lines in Fig. 2.

It will be clear from the foregoing description that it will be impossible to set up the brakes without throwing out the clutch. If now the driver desires not to maintain the full fluid pressure on the brakes but only keep them lightly set, he can move his handle 54 to the position marked A and then quickly move it back to the position marked C. This will move the plug valve 53 so as to set the brakes up at the predetermined pressure and then will move the plug valve 53 so that the ports 55 and 56 do not communicate with any of the ports 60, 61, 57, 58, 59 or 62. This will maintain the pressure which is allowed to go into the brake cylinder 12 when the handle 54 is in the position indicated at A. Movement of the handle 54 from the position marked C to that marked D and immediately back to the position marked C will release some of the pressure in the brake cylinder 12 and thus if too great a pressure is put upon the brakes when the handle 54 is in the position marked A, some of that pressure can be released by movement of the handle 54 from the C position to the D position and back again as just described.

It will be apparent from the foregoing description that we are able to maintain on the brakes of the vehicle any desired fluid pressure and to release and set the brakes very quickly and likewise to couple and uncouple the clutch mechanism without in any way affecting the brake control and maintain the clutch mechanism in its coupled or uncoupled position as desired.

It will be evident to those skilled in the art that our air controlling means is simple, efficient, easily operated and would work as well on a heavy car with high horse power as on a lighter car.

By means of the construction described, we are able to obtain a very efficient control and maintain any desired pressure without the use of an air pump.

By means of our invention the car driver is relieved of the hard metal exertion required in the ordinary high power automobiles where it is necessary to keep the clutch mechanism uncoupled by means of a foot pedal.

The many other advantages resulting from the use of our invention will be clear to those skilled in the art.

Having thus described our invention what we claim is:

1. In an automobile brake mechanism, the combination with the engine cylinders and engine exhaust fluid controlling means; of an exhaust fluid reservoir, a check valve placed between said engine cylinders and said reservoir and a pressure reducing valve placed between said reservoir and said fluid controlling means.

2. In an automobile brake mechanism, the combination with the engine cylinders and engine exhaust fluid controlling means; of an exhaust fluid reservoir, a compression retaining valve placed between said cylinders and said controlling means, a check valve placed between said cylinders and said compression retaining valve and a pressure reducing valve placed between said reservoir and said controlling means.

3. In an automobile brake mechanism, the combination with the engine cylinders and engine exhaust fluid controlling means; of an exhaust fluid reservoir, means between said reservoir and said engine cylinders for maintaining the proper compression in the said engine cylinders, means placed between said fluid reservoir and said controlling means for maintaining a predetermined pressure of the exhaust fluid passing through said controlling means and check valves placed between said cylinders and said means for maintaining the compression in said cylinders.

4. In an automobile brake mechanism, the combination with the engine cylinders and brake mechanism; of an engine exhaust fluid reservoir, a compression retaining valve between said fluid reservoir and said engine cylinders, check valves between said retaining valve and said cylinders, engine exhaust fluid controlling means between said reservoir and said brake mechanism and means for operating said brake mechanism whereby the brakes may be set or released.

5. In an automobile brake mechanism, the combination with the engine cylinders and brake mechanism; of an engine exhaust fluid reservoir, a compression retaining valve between said fluid reservoir and said engine cylinders, check valves between said retaining valve and said cylinders, engine exhaust fluid controlling means between said reservoir and said brake mechanism, an exhaust fluid cylinder, a piston movable in said cylinder, means connecting said piston to said brake mechanism, pipes connecting each end of said fluid cylinder to said controlling means whereby the brakes may be set or released.

6. In an automobile brake mechanism, the combination with the engine cylinders and brake mechanism; of an engine exhaust fluid reservoir, a compression retaining valve between said fluid reservoir and said engine cylinders, check valves between said retaining valve and said cylinders, engine exhaust fluid controlling means between said reservoir and said brake mechanism, an exhaust fluid cylinder, a piston movable in said cylinder, a piston rod secured to said piston and projecting through one end of said fluid cylinder, levers connecting said piston rod with said brake mechanism, pipes connecting each end of said fluid cylinder to said controlling means whereby the brakes may be set or released.

7. In an automobile brake mechanism, the combination with the engine cylinders and brake mechanism; of an exhaust fluid reservoir, combined check valves and priming cups between said cylinders and said reservoir, cut-out valves in said combined check valves and priming cups, an engine exhaust fluid controlling valve between said reservoir and said brake mechanism, an exhaust fluid cylinder, a piston mounted upon a piston rod movable in said fluid cylinder, a spiral spring in each end of said fluid cylinder and bearing against said piston, levers connecting said piston rod with said brake mechanism, pipes connecting each end of said fluid cylinder with separate connections on said controlling valves whereby the brakes may be set or released.

8. In an automobile clutch and brake mechanism, the combination with the engine cylinders and clutch and brake mechanisms; of an engine exhaust fluid reservoir, check valves between said fluid reservoir and said cylinders, engine exhaust fluid controlling means between said reservoir and said clutch and brake mechanism and means for operating said clutch and brake mechanisms whereby the clutch may be engaged or disengaged and the brake set only after the clutch has been disengaged or released before the clutch is engaged.

9. In an automobile clutch and brake mechanism, the combination with the engine cylinders and clutch and brake mechanisms; of an engine exhaust fluid reservoir, a compression retaining valve placed between said fluid reservoir and said engine cylinders, check valves between said fluid reservoir and said engine cylinders, engine exhaust fluid controlling means between said reservoir and said clutch and brake mechanisms, an exhaust fluid cylinder, a piston movable in said cylinder, means connecting said piston to said clutch mechanism, means connecting said piston to said brake mechanism, and pipes connecting each end of said fluid cylinder to said controlling means whereby the clutch may be engaged or disengaged and the brake set only after the clutch has been disengaged or released before the clutch is engaged.

10. In an automobile clutch and brake mechanism, the combination with the engine cylinders and clutch and brake mechanisms; of an engine exhaust fluid reservoir, a compression retaining valve placed between said fluid reservoir and said engine cylinders, check valve between said fluid reservoir and said engine cylinders, engine exhaust fluid controlling means between said reservoir and said clutch and brake mechanisms, an exhaust fluid cylinder, a piston movable in said cylinder, a piston rod secured to said piston and projecting through one end of said fluid cylinder, a bell crank lever provided with a slot having an angular and a straight portion, a pin carried by said piston rod and engaging said slot, levers connecting said bell crank with said clutch mechanism and operable only when said pin is traveling through the angular portion of said slot, levers connecting said pin with said brake mechanism and operable only when said pin is traveling through the straight portion of said slot, pipes connecting each end of said fluid cylinders to said controlling means whereby the clutch may be engaged or disengaged and the brake set only after the clutch has been disengaged or released before the clutch is engaged.

11. In an automobile clutch and brake mechanism, the combination with engine cylinders, clutch and brake mechanisms; of an exhaust fluid reservoir, combined check valves and priming cups between said cylinder and said reservoir, cut-out valves in said combined check valves and priming cups, engine exhaust fluid controlling valve between said reservoir and said clutch and brake mechanisms, an exhaust fluid cylinder, a piston mounted upon a piston rod and movable in said fluid cylinder, a spiral spring in each end of said fluid cylinder and bearing against said piston, a bell crank lever provided with a slot having an angular and a straight portion, a pin carried by said piston rod and engaging said slot, levers connecting said bell crank with said clutch mechanism and operable only when said pin is traveling through the angular portion of said slot, levers connecting said pin with said brake mechanism and operable only when said pin is traveling through the straight portion of said slot, pipes connecting each end of said fluid cylinders to separate connections on said controlling valve whereby the clutch may be engaged or disengaged and the brake set only after the clutch has been disengaged or released before the clutch is engaged.

12. In an automobile clutch and brake mechanism, the combination with engine cylinders, clutch and brake mechanisms; of compression retaining means, check valves between said retaining means and said engine cylinders, a pressure reducing valve, an engine exhaust fluid reservoir between said retaining means and said pressure reducing valve and means for controlling the operation of said clutch mechanism and said brake mechanism.

13. In an automobile clutch and brake mechanism the combination with engine cylinders, clutch and brake mechanisms; of engine exhaust fluid controlling means, exhaust fluid cylinder provided with a piston and piston rod, pipe connections between said engine cylinders and said controlling means and between said controlling means and each end of said fluid cylinder, a clutch controlling valve, pipe connections between said clutch controlling valve and said fluid cylinder at some intermediate point in the length thereof, pipe connections between said clutch controlling valve and said fluid controlling valve and means connecting said piston rod with said clutch mechanism and said brake mechanism whereby the clutch may be engaged or disengaged and the brake set only after the clutch has been disengaged or released before the clutch is engaged.

14. In an automobile clutch and brake mechanism, the combination with the engine cylinders, clutch and brake mechanism; of an engine exhaust fluid reservoir, check valves in the connection between said engine cylinders and said reservoir, an engine exhaust fluid controlling valve, a pressure reducing valve placed in the pipe connection between said reservoir and said fluid controlling valve, an exhaust fluid cylinder provided with a piston and piston rod, pipes connecting each end of said fluid cylinder and said fluid controlling valve, a clutch controlling valve, a pipe connection between said clutch controlling valve and said fluid cylinder at some intermediate point in the length thereof, a pipe connection between said clutch controlling valve and said fluid controlling valve, a bell crank lever provided with a slot having an angular and a straight portion, a pin carried by said piston rod and engaging said slot, levers connecting said pin to said clutch mechanism and levers connecting said bell crank with said brake mechanism whereby the clutch may be engaged or disengaged and the brake set only after the clutch has been disengaged or released before the clutch is engaged.

15. In an automobile clutch and brake mechanism, the combination with engine cylinders and an engine exhaust fluid reservoir of a compression retaining valve placed in the pipe connection between said engine cylinders and said reservoir comprising a body provided with a port passing through it, means for connecting piping to and from said port, a diaphragm mounted in said body and exposed to the entrance side of said port, a needle valve carried by said diaphragm and seated within said port, means for normally holding said needle valve upon its seat and means for regulating the pressure of said needle valve on its seat.

16. In an automobile clutch and brake mechanism, the combination with the engine cylinders, an engine exhaust fluid reservoir and engine exhaust controlling means; of a compression retaining valve placed in the pipe connecting said reservoir to said engine cylinders, a pressure reducing valve placed in the pipe connecting said reservoir to said fluid controlling valve, comprising a valve body provided with inlet and outlet ports, a diaphragm placed within a valve chamber in said valve body, a valve stem carrying said diaphragm and vertically movable in said body, a valve, mounted in said inlet port which normally tends to seat itself and which normally is in contact with said valve stem carrying said diaphragm, said valve stem and said valves being so arranged that when the pressure on said diaphragm is reduced said valve stem will force said valve away from its seat and when said pressure on said diaphragm is increased said valve stem will allow said valve to seat itself and means for connecting pipes to said inlet and outlet ports.

17. In an automobile clutch and brake mechanism, the combination with the engine cylinder, engine exhaust fluid reservoir, engine exhaust fluid controlling means; of an exhaust fluid cylinder, means connecting the piston rod of said fluid cylinder with said clutch and brake mechanisms and a clutch controlling valve placed in one of the pipe connections between said fluid cylinder and said fluid controlling means comprising a valve casing provided with inlet and outlet ports, means for connecting pipes to said inlet and outlet ports, a diaphragm placed within the valve chamber in said body, said valve chamber being connected to the fluid cylinder at a point intermediate the length thereof by means of piping a valve stem carrying said diaphragm, a valve carried by said valve stem, means for normally holding said valve away from its seat and means for connecting said exhaust fluid controlling valve with said fluid cylinder when said valve is away from its seat and for disconnecting said fluid controlling means and said fluid cylinder when said valve is on its seat.

18. In an automobile clutch and brake mechanism, the combination with the engine cylinder, an engine exhaust fluid reservoir, an engine exhaust fluid controlling means and clutch and brake mechanisms; of an exhaust fluid cylinder placed between and connected to said fluid controlling means and said clutch and brake mechanism, comprising a piston traveling within said fluid cylinder, a piston rod secured to said piston and being provided at its outer end with a pin, a bell crank lever provided with a slot having an angular portion and a straight portion in which is slidably disposed said pin, means connecting said clutch mechanism with said lever and means connecting said pin with said brake mechanism whereby the clutch may be engaged or disengaged and the brake set only after the clutch has been disengaged or released before the clutch is engaged.

19. In an automobile clutch and brake mechanism, the combination with the engine cylinders, an engine exhaust fluid reservoir, clutch and brake mechanisms and an exhaust fluid cylinder; of an engine exhaust controlling means, comprising a casing, a plug valve rotatable within said casing and means for rotating said plug valve so that fluid can be conducted from said fluid reservoir to said fluid cylinder for disengaging the said clutch mechanism and applying the said brake mechanism, or for releasing the said brake mechanism and engaging the said clutch mechanism, or for operating the said clutch mechanism or said brake mechanism independently of each other.

In testimony whereof we have hereunto set our hands in the presence of two witnesses.

HENRY M. KUGLER.
WILLIAM T. CLARK.

Witnesses:
ETHEL A. KELLY,
WALTER H. KELLEY.